United States Patent
Sakaguchi et al.

(10) Patent No.: US 10,072,988 B2
(45) Date of Patent: Sep. 11, 2018

(54) TEMPERATURE-DETECTING DEVICE

(71) Applicant: Panasonic Intellectual Property Management Co., Ltd., Osaka (JP)

(72) Inventors: Yoshiya Sakaguchi, Kyoto (JP); Kazuhiko Kubo, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 145 days.

(21) Appl. No.: 15/113,778

(22) PCT Filed: Dec. 18, 2014

(86) PCT No.: PCT/JP2014/006315
§ 371 (c)(1),
(2) Date: Jul. 22, 2016

(87) PCT Pub. No.: WO2015/125198
PCT Pub. Date: Aug. 27, 2015

(65) Prior Publication Data
US 2017/0003175 A1    Jan. 5, 2017

(30) Foreign Application Priority Data

Feb. 18, 2014 (JP) .................................. 2014-028058

(51) Int. Cl.
*G01K 7/00* (2006.01)
*G01K 7/22* (2006.01)
(Continued)

(52) U.S. Cl.
CPC .................. *G01K 7/22* (2013.01); *G01K 1/18* (2013.01); *H01M 10/486* (2013.01)

(58) Field of Classification Search
USPC ........................................ 374/208, 100, 163
See application file for complete search history.

(56) References Cited

U.S. PATENT DOCUMENTS 5,735,606 A * 4/1998 Tani ...................... G01F 1/6845
338/25
7,416,332 B2 * 8/2008 Rountree ................. G01K 1/14
257/180
(Continued)

FOREIGN PATENT DOCUMENTS

JP    8-222773    8/1996
JP    9-065528    3/1997
(Continued)

OTHER PUBLICATIONS

International Search Report of PCT application No. PCT/JP2014/006315 dated Feb. 3, 2015.

*Primary Examiner* — Mirellys Jagan
(74) *Attorney, Agent, or Firm* — McDermott Will & Emery LLP

(57) ABSTRACT

A temperature-detecting device includes a thermally conductive sheet, a heat-generating body thermally connected to a first end portion of the thermally conductive sheet, and a temperature-detecting element thermally connected to a second end portion of the thermally conductive sheet. This temperature-detecting device is also provided with thermally insulating layers on the top and bottom faces of the thermally conductive sheet between the first and second end portions thereof.

4 Claims, 1 Drawing Sheet

(51) Int. Cl.
   *G01K 1/18*      (2006.01)
   *H01M 10/48*      (2006.01)

(56)          References Cited

U.S. PATENT DOCUMENTS

| | | | | |
|---|---|---|---|---|
| 9,028,137 | B2* | 5/2015 | Sjolund | B60N 2/5678 |
| | | | | 136/200 |
| 2004/0101030 | A1* | 5/2004 | Trapasso | G01K 1/14 |
| | | | | 374/165 |
| 2013/0083326 | A1* | 4/2013 | Clark | G01K 1/16 |
| | | | | 356/459 |
| 2014/0177673 | A1* | 6/2014 | Bliss | G01N 25/18 |
| | | | | 374/165 |

FOREIGN PATENT DOCUMENTS

| | | |
|---|---|---|
| JP | 2011-033479 | 2/2011 |
| JP | 2013-030375 | 2/2013 |
| JP | 2013-108574 | 6/2013 |
| JP | 2013-155828 | 8/2013 |
| JP | 2014-007813 | 1/2014 |

\* cited by examiner

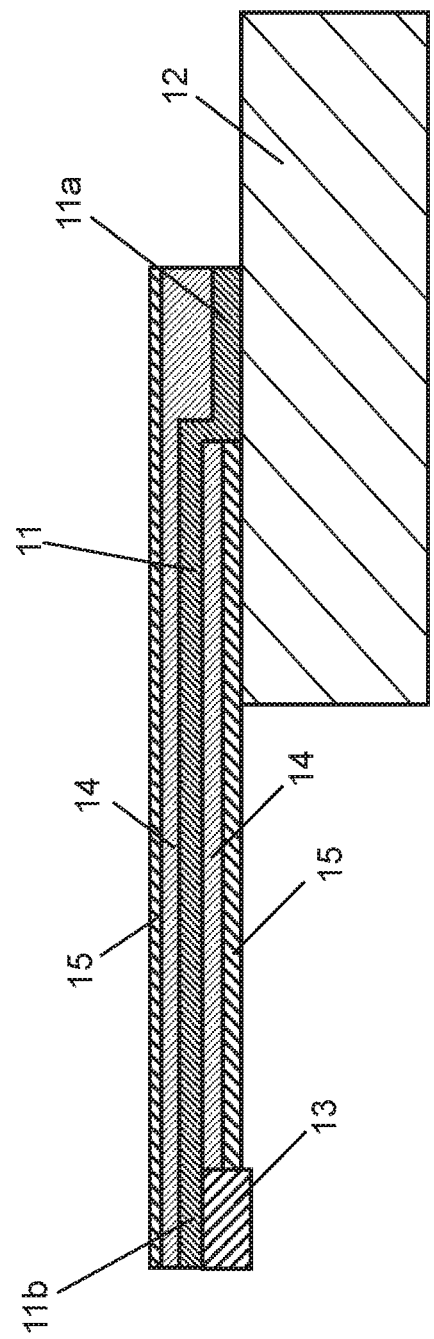

TEMPERATURE-DETECTING DEVICE

CROSS-REFERENCE TO RELATED APPLICATIONS

This application is a U.S. national stage application of the PCT International Application No. PCT/JP2014/006315 filed on Dec. 18, 2014, which claims the benefit of foreign priority of Japanese patent application 2014-028058 filed on Feb. 18, 2014, the contents all of which are incorporated herein by reference.

TECHNICAL FIELD

The present invention relates to temperature-detecting devices for detecting temperature of secondary batteries typically during charging and discharging.

BACKGROUND ART

Secondary batteries, such as of lithium ion, have been broadly used in a range of electronic devices. However, secondary batteries, such as of lithium ion, generate heat during charging and discharging. Therefore, temperature needs to be monitored to control charging and discharging of secondary batteries. In general, a thermistor with lead is placed near a secondary battery to measure temperature.

PTL1 is one of known patent literatures in the prior art related to the present invention.

CITATION LIST

Patent Literature

PTL1 Japanese Patent Unexamined Publication No. 2013-30375

SUMMARY OF THE INVENTION

A temperature-detecting device of the present invention includes a thermally conductive sheet, a heat-generating body that is thermally connected to a first end portion of the thermally conductive sheet, and a temperature-detecting element that is thermally connected to a second end portion of the thermally conductive sheet. This temperature-detecting device is also provided with thermally insulating layers on the top and bottom faces of the thermally conductive sheet between the first and second end portions thereof.

As the temperature of the heat-generating body rises in the above structure, the temperature is conducted from the first end portion to the second end portion of the thermally conductive sheet, and then to the temperature-detecting element. The thermally insulating layer is provided on both faces (too and bottom faces) of the thermally conductive sheet between the first end portion and second end portion, so as to prevent a temperature decrease due to heat radiation from the thermally conductive sheet as the temperature is transmitted through the thermally conductive sheet. Accordingly, a time delay in temperature measurement or an error in temperature measurement can be reduced. Furthermore, since any distance is selectable between a measuring point on the heat-generating body and the temperature-detecting element, design flexibility can be increased.

BRIEF DESCRIPTION OF DRAWINGS

The FIGURE is a sectional view of equipment employing a temperature-detecting device in accordance with an exemplary embodiment of the present invention.

DESCRIPTION OF EMBODIMENTS

A disadvantage of the prior art is described before describing an exemplary embodiment.

If a thermistor is disposed near a secondary battery, a time delay in temperature measurement or an error in temperature measurement tends to occur due to variations in a distance between the secondary battery and thermistor. A temperature threshold for charging and discharging thus needs to be set, taking into account the time delay and error. Accordingly, it is difficult to fully demonstrate the performance of the secondary battery. Still more, a temperature-detecting circuit needs to be provided near the secondary battery. This hinders the design flexibility.

Exemplary Embodiment

A temperature-detecting device in the exemplary embodiment of the present invention is described below with reference to drawings.

The FIGURE is a sectional view of equipment employing the temperature-detecting device in the exemplary embodiment of the present invention. Thermally conductive sheet 11 is formed of about 17-μm thick pyrolytic graphite sheet, and its one end 11a abuts on heat-generating body 12 of a lithium-ion secondary battery to thermally connect heat-generating body 12 and thermally conductive sheet 11. Other end portion 11b (second end portion) of thermally conductive sheet 11 on the opposite side of one end portion 11a is thermally connected to temperature-detecting element 13 configured with a surface-mounted thermistor element. Thermally insulating layer 14 is also provided on a top face and a bottom face of thermally conductive sheet 11 between one end portion 11a (first end portion) and other end portion 11b (second end portion). Thermally insulating layer 14 is about 0.5 mm thick and formed of a sheet of non-woven fabric impregnated with silica. A heat conductivity of thermally insulating layer 14 is about 0.03 W/mK. A heat conductivity of the thermally insulating layer is preferably 0.2 W/mK or less and more preferably 0.1 W/m·K or less.

The temperature-detecting device in the exemplary embodiment as configured above immediately transmits a temperature rise to temperature-detecting element 13 through thermally conductive sheet 11 if the temperature of heat-generating body 12 rises. Since thermally conductive sheet 11 is covered with thermally insulating layer 14 in this temperature-rise transmission path, a time delay in temperature measurement and a measurement error can be reduced.

If a heat capacity of thermally conductive sheet 11 is large, the heat from heat-generating body 12 is used for increasing the temperature of thermally conductive sheet 11. This may degrade the temperature measurement accuracy. In the exemplary embodiment, a pyrolytic graphite sheet of about 17 μm thick is used as thermally conductive sheet 11. Therefore, the heat capacity of thermally conductive sheet 11 is small, and its heat conductivity is about 1850 W/m·K, which is extremely high. Accordingly, the temperature-detecting device in the exemplary embodiment can accurately measure the temperature. The pyrolytic graphite sheet tends to have higher heat conductivity as its thickness becomes thinner. Since the heat capacity is smaller as the thickness of the pyrolytic graphite sheet becomes thinner, thermally conductive sheet 11 is preferably formed of the pyrolytic graphite sheet with a thickness of 20 µm or less.

The graphite sheet tends to radiate transmitted heat as infrared rays. Therefore, even though thermally insulating layers 14 are provided, energy is released outside in the path from heat-generating body 12 to temperature-detecting element 13. Accordingly, the temperature near temperature-detecting element 13 may decrease, resulting in poor temperature measurement accuracy. It is thus preferable to further provide infrared reflecting layer 15 on the surface of thermally insulating layer 14. By further providing infrared reflecting layer 15, infrared rays emitted from thermally conductive sheet 11 can be reflected and returned to thermally conductive sheet 11. Accordingly, degradation of the temperature measurement accuracy can be suppressed. The infrared reflecting layer 15 is a layer whose emissivity of infrared rays of 10-µm wavelength is 0.1 or less. For example, infrared reflecting layer 15 can be formed by depositing a metal, such as aluminum, on a polyethylene terephthalate (hereinafter referred to as PET) tape. The infrared emissivity of infrared reflecting layer 15 can be decreased by reducing its surface roughness.

In the above exemplary embodiment, a temperature of one secondary battery (heat-generating body 12) is measured. If there are multiple secondary batteries (multiple heat-generating bodies 12), each secondary battery (heat-generating body 12) is provided with separate thermally conductive sheet 11 so that the temperature of each secondary battery (heat-generating body 12) can be measured separately. Temperature-detecting element 13 may be disposed only at one point even if multiple thermally conductive sheets 11 are provided.

Still more, by enlarging an area that heat-generating body 12 and thermally conductive sheet 11 are thermally connected, the temperature of the entire heat-generating body, and not the local temperature, can be measured. This can improve the temperature measurement accuracy.

The exemplary embodiment refers to the use of a graphite sheet for thermally conductive sheet 11. However, for example, a PET film may be attached to both faces of the graphite sheet. This structure facilitates handling of thermally conductive sheet 11. In this structure, it is important to use thermally insulating layer 14 that is thicker than the PET film covering both faces of the graphite sheet and has a low heat conductivity.

Furthermore, a double-sided tape may be used at portions thermally connecting heat-generating body 12 and temperature-detecting element 13. For example, by attaching heat-generating body 12 and one end portion 11a with the double-sided tape, a thermal connection of heat-generating body 12 and one end portion 11a can be stabilized. In addition, by attaching temperature-detecting element 13 and other end portion 11b with the double-sided tape, a thermal connection of temperature-detecting element 13 and other end portion 11b can be stabilized.

INDUSTRIAL APPLICABILITY

The temperature-detecting device of the present invention can reduce a time delay and error in temperature measurements. Furthermore, design flexibility can be increased. Accordingly, the present invention is effectively applicable to industrial use.

REFERENCE MARKS IN THE DRAWINGS

11 Thermally conductive sheet
11a One end portion (first end portion)
11b Other end portion (second end portion)
12 Heat-generating body
13 Temperature-detecting element
14 Thermally insulating layer
15 Infrared reflecting layer

The invention claimed is:

1. A temperature-detecting device comprising:
   a thermally conductive sheet having a first face and a second face;
   a heat-generating body thermally connected to a first end portion of the thermally conductive sheet;
   a temperature-detecting element thermally connected to a second end portion of the thermally conductive sheet;
   a first thermally insulating layer provided on the first face of the thermally conductive sheet between the first end portion and the second end portion;
   a second thermally insulating layer provided on the second face of the thermally conductive sheet between the first end portion and the second end portion; and
   an infrared reflecting layer provided on a surface of the first thermally insulating layer.

2. The temperature-detecting device of claim 1, wherein the thermally conductive sheet is formed of a graphite sheet.

3. The temperature-detecting device of claim 1, wherein each of a heat conductivity of the first thermally insulating layer and a heat conductivity of the second thermally insulating layer is less than or equal to 0.2 W/m·K.

4. The temperature-detecting device of claim 3, wherein each of the first thermally insulating layer and the second thermally insulating layer is formed of a sheet of non-woven fabric impregnated with silica.

* * * * *